US012719908B1

(12) United States Patent
Deardorff

(10) Patent No.: US 12,719,908 B1
(45) Date of Patent: Aug. 25, 2026

(54) MACHINED LEARNED CORRELATION OF INTERNAL AND EXTERNAL INVENTORIES OF COMPUTING ASSETS TO IDENTIFY VULNERABILITIES

(71) Applicant: Rapid7, Inc., Boston, MA (US)

(72) Inventor: Paul Deardorff, San Francisco, CA (US)

(73) Assignee: Rapid7, Inc., Boston, MA (US)

( * ) Notice: Subject to any disclaimer, the term of this patent is extended or adjusted under 35 U.S.C. 154(b) by 565 days.

(21) Appl. No.: 18/115,939

(22) Filed: Mar. 1, 2023

(51) Int. Cl.
*H04L 9/00* (2022.01)
*H04L 9/40* (2022.01)

(52) U.S. Cl.
CPC ...... *H04L 63/1433* (2013.01); *H04L 63/1425* (2013.01)

(58) Field of Classification Search
CPC ........................ H04L 63/1425; H04L 63/1433
USPC ........................................................... 726/25
See application file for complete search history.

(56) References Cited

U.S. PATENT DOCUMENTS 10,848,516 B2 11/2020 Lin
10,986,135 B2 4/2021 Molloy et al.
2006/0101517 A1* 5/2006 Banzhof ............. H04L 63/1433 726/25
2014/0047546 A1* 2/2014 Sidagni ................. G06F 21/577 726/25
2019/0342162 A1* 11/2019 Bendre ............... H04L 67/1001
2020/0259858 A1 8/2020 Satish et al.
2023/0171282 A1* 6/2023 Bollinger, III ........ H04L 63/102 726/25
2024/0095662 A1* 3/2024 Xiao ....................... H04L 41/16

* cited by examiner

*Primary Examiner* — Christopher J Brown
(74) *Attorney, Agent, or Firm* — Ashwin Anand

(57) ABSTRACT

As an example, a server may determine a first set of assets using an internal scan engine, determine a second set of assets using an external scan engine, perform a proxy de-obfuscation process to determine a third set of assets, and combine them to create a set of combined assets that includes records of multiple hosts in an enterprise network. The server performs a correlation process using the set of combined assets to create a set of correlated assets by comparing attributes of an asset with other attributes of other assets to reduce duplicate entries. An artificial intelligence may be used to determine a risk of attack for individual assets in the set of correlated assets and to suggest a solution to address the risk of attack for at least one correlated asset in the set of correlated assets.

14 Claims, 8 Drawing Sheets

400

SEND MULTIPLE DATA REQUESTS (E.G., BY AN INTERNAL SCAN ENGINE) TO MULTIPLE HARDWARE HOSTS IN AN ENTERPRISE NETWORK
402

RECEIVE DATA ASSOCIATED WITH AN INDIVIDUAL HARDWARE HOST OF THE MULTIPLE HARDWARE HOSTS IN RESPONSE TO AN INDIVIDUAL DATA REQUEST OF THE MULTIPLE DATA REQUESTS
404

CREATE A SET OF INTERNAL ASSETS THAT INCLUDES HARDWARE HOSTS IN THE NETWORK BASED AT LEAST IN PART ON THE DATA
406

PERFORM A COMPARISON OF ATTRIBUTES OF A PARTICULAR HARDWARE HOST WITH OTHER ATTRIBUTES OF OTHER HARDWARE HOSTS IN THE HOST DATA
408

BASED ON THE COMPARISON, MERGE ATTRIBUTES OF THE PARTICULAR HARDWARE HOST WITH ANOTHER HARDWARE HOST IF THERE ARE GREATER THAN A THRESHOLD NUMBER OF ATTRIBUTES THAT OVERLAP (E.G., TO REDUCE DUPLICATION) IN THE SET OF INTERNAL ASSETS
410

MAINTAIN THE SET OF INTERNAL ASSETS BASED ON SENDING ADDITIONAL DATA REQUESTS AT A LATER DATE
412

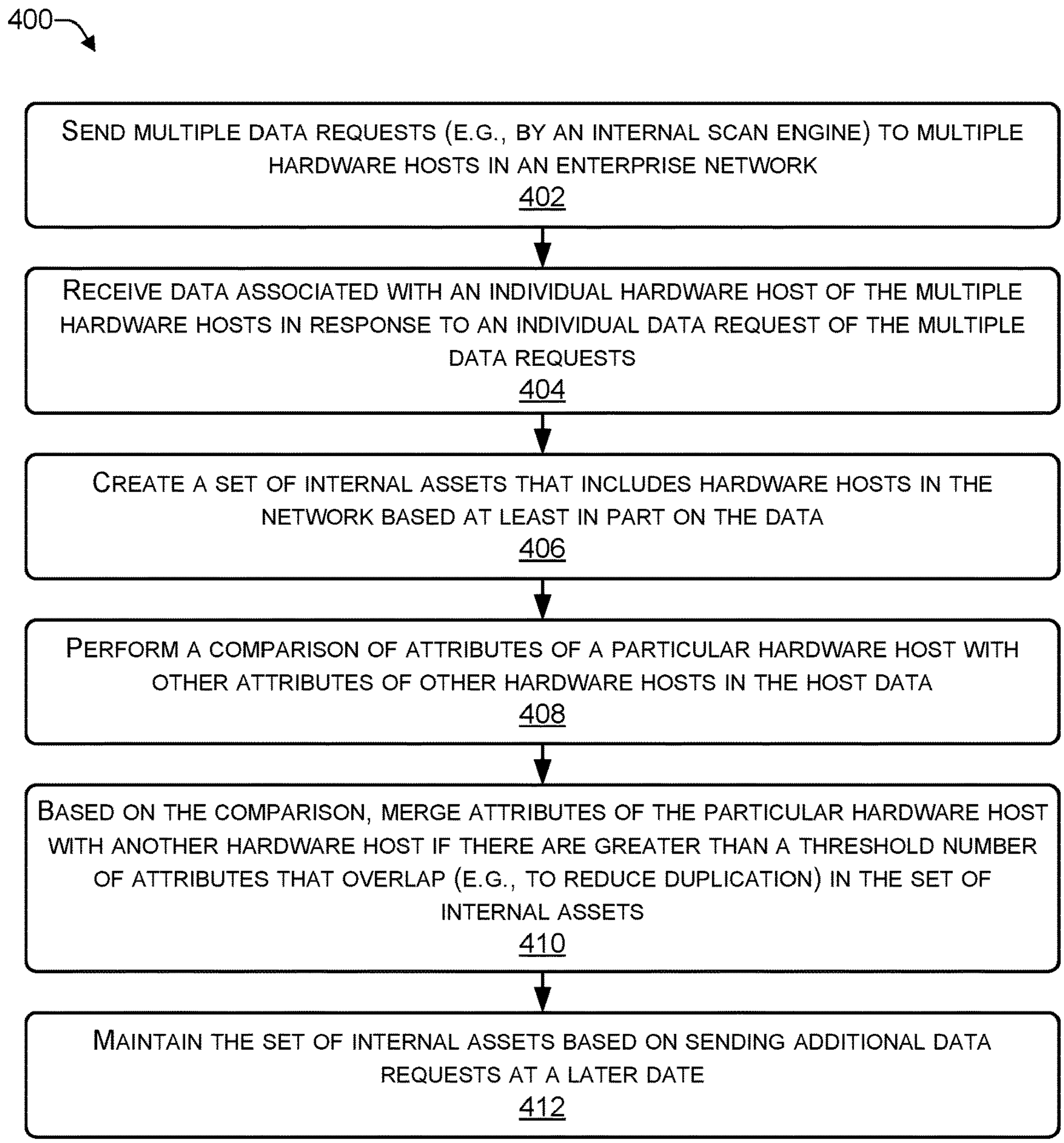

RECEIVE (BY AN EXTERNAL SCAN ENGINE) INPUT PARAMETERS (E.G., NETWORK CLASSLESS INTER-DOMAIN ROUTING (CIDR) RANGES, DOMAIN NAMES, OR THE LIKE) ASSOCIATED WITH AN ENTERPRISE NETWORK
502

PERFORM ACTIONS (E.G., FDNS, RDNS, HTTP GET, OR THE LIKE) BASED ON THE INPUT PARAMETERS TO DETERMINE HOST ADDRESSES OF MULTIPLE HARDWARE HOSTS IN THE ENTERPRISE NETWORK
504

SEND MULTIPLE PROBES (E.G., TCP SCAN, UDP SCAN, OR THE LIKE) TO THE MULTIPLE HARDWARE HOSTS, WHERE INDIVIDUAL PROBES OF THE MULTIPLE PROBES ARE SENT TO INDIVIDUAL HARDWARE HOSTS OF THE MULTIPLE HARDWARE HOSTS
506

RECEIVE HOST DATA FROM THE INDIVIDUAL HARDWARE HOSTS (E.G., IN RESPONSE TO SENDING THE INDIVIDUAL PROBES)
508

CREATE A SET OF EXTERNALLY ACCESSIBLE ASSETS THAT INCLUDES HARDWARE HOSTS IN THE NETWORK BASED AT LEAST IN PART ON THE HOST DATA
510

PERFORM A COMPARISON OF ATTRIBUTES OF A PARTICULAR HARDWARE HOST WITH OTHER ATTRIBUTES OF OTHER HARDWARE HOSTS IN EXTERNALLY ACCESSIBLE ASSETS
512

BASED ON THE COMPARISON, MERGE ATTRIBUTES OF THE PARTICULAR HARDWARE HOST WITH ANOTHER HARDWARE HOST IF THERE IS GREATER THAN A THRESHOLD NUMBER OF ATTRIBUTES THAT OVERLAP (E.G., TO REDUCE DUPLICATION) IN THE SET OF EXTERNALLY ACCESSIBLE ASSETS
514

MAINTAIN THE SET OF EXTERNALLY VISIBLE ASSETS BASED ON SENDING ADDITIONAL PROBES AT A LATER DATE
516

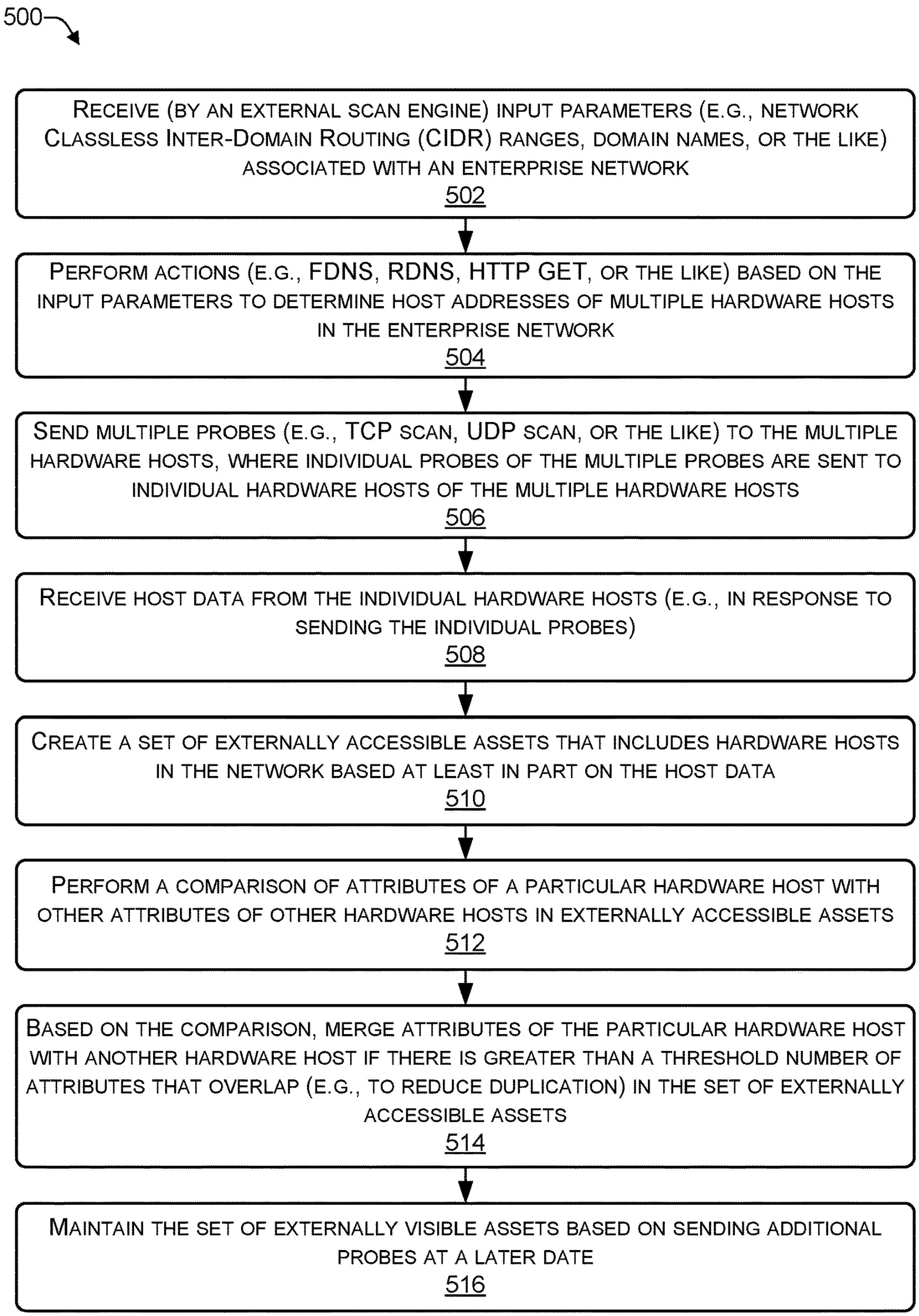

FIG. 5

MACHINED LEARNED CORRELATION OF INTERNAL AND EXTERNAL INVENTORIES OF COMPUTING ASSETS TO IDENTIFY VULNERABILITIES

BACKGROUND

Many companies operate private computer networks that are connected to public networks such as the Internet. While such connections allow company users to easily access resources on the public networks, they also create vulnerabilities in the company network. For example, company users may unwittingly download malicious content (e.g., data, files, applications, programs, etc.) onto the company network from untrusted sources on the Internet. As another example, interactions of company users with the public network may provide opportunities for malicious actors to attack the company network. A malicious actor can plant spyware, viruses, or other types of malicious software in a company's private network though a variety of interactive means, in order to steal sensitive information from the company or even gain control of the company's computing systems. As a result, enterprise security systems have become increasingly important to protect company networks against these types of vulnerabilities.

Enterprises, such as corporations and government organizations, may not have an accurate view of their network infrastructure, particularly from an external perspective. For example, the network infrastructure may include cloud infrastructure, customer-premise equipment (CPE), and third-party infrastructure, such as content delivery networks (CDNs), proxy services, load balancers, and the like. This may result in some components of the network being "hidden" internally (e.g., behind a third-party hosted load balancer or proxy service) but externally exposed and vulnerable to an attack. Without an accurate view of the network infrastructure, the organization may find it difficult to manage an attack perimeter of the network infrastructure because portions of the network infrastructure, unbeknownst to the enterprise, may be external-facing and vulnerable to an attack.

SUMMARY OF THE DISCLOSURE

This Summary provides a simplified form of concepts that are further described below in the Detailed Description. This Summary is not intended to identify key or essential features and should therefore not be used for determining or limiting the scope of the claimed subject matter.

As an example, a server may determine a first set of assets using an internal scan engine, determine a second set of assets using an external scan engine, perform a proxy de-obfuscation process to determine a third set of assets, and combine the first set of assets, the second set of assets, and the third set of assets to create a set of combined assets. The set of combined assets includes records corresponding to a plurality of servers in an enterprise network. The server performs a correlation process using the set of combined assets to create a set of correlated assets. The correlation process compares attributes of an asset with other attributes of other assets in the combined set of assets to identify and reduce duplicate entries. An artificial intelligence algorithm may be used to determine a risk of attack associated with individual assets in the set of correlated assets and to suggest a solution to address the risk of attack for at least one correlated asset in the set of correlated assets.

BRIEF DESCRIPTION OF THE DRAWINGS

A more complete understanding of the present disclosure may be obtained by reference to the following Detailed Description when taken in conjunction with the accompanying Drawings. In the figures, the left-most digit(s) of a reference number identifies the figure in which the reference number first appears. The same reference numbers in different figures indicate similar or identical items.

FIG. 4 is a flowchart of a process that includes creating a set of internal assets, according to some embodiments.

FIG. 5 is a flowchart of a process that includes creating a set of externally accessible assets, according to some embodiments.

DETAILED DESCRIPTION

Figure 1:
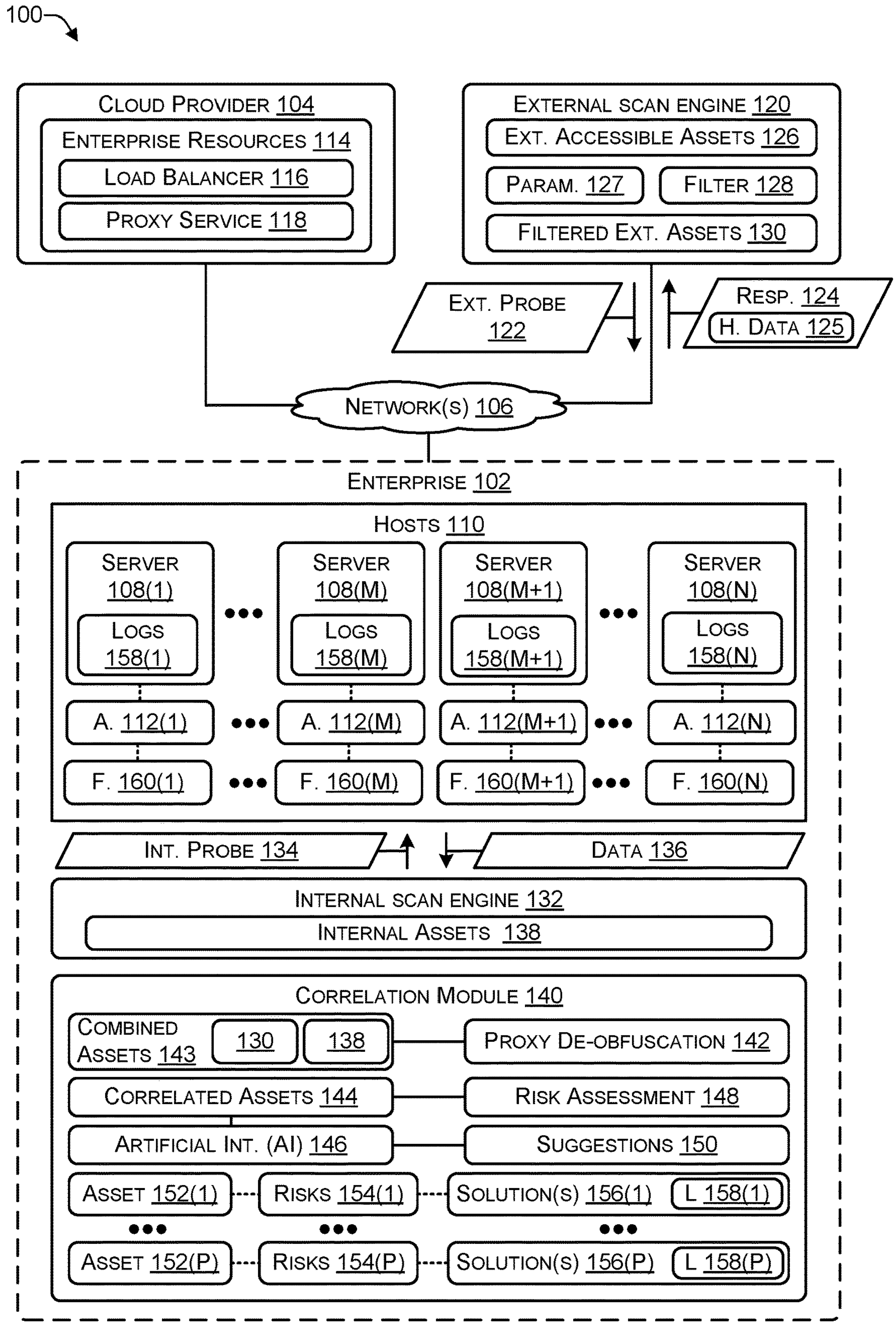
FIG. 1 is a block diagram of a system that includes a correlation engine, according to some embodiments.

The systems and techniques described herein enable a network owner (e.g., an enterprise) to identify network assets (e.g., network hardware, such as servers, and the like) that are accessible externally (e.g., from outside the network), view potential risks associated with each asset, view suggestions generated by an artificial intelligence (AI) to address the potential risks, and implement one or more of the suggestions to protect the attack perimeter (e.g., by reducing externally accessible vulnerabilities). Thus, an enterprise (or other entity) is able to determine a relatively complete asset inventory that takes into account proxy services, load balancers, and similar services that are hosted by a third party (e.g., Amazon Web Services (AWS), Crowdstrike, or the like) and view suggestions to address issues with assets in the asset inventory based on the attack surface associated with one or more of the assets. The term "asset", as used herein, refers to a hardware component in an enterprise network, such as a server, a router, a domain controller, or another type of computing device.

Typically, an enterprise only performs an internal scan and protects assets revealed by the internal scan. However, the internal scan may not reveal all assets associated with the enterprise. For example, the enterprise may purchase server for a particular purpose and, over time, the servers may get re-purposed, resulting in the enterprise being unaware that this repurposing has created a vulnerability, such as by exposing the server to external access. As another example, the enterprise may use a proxy service or a load balancer) hosted by a third party. The proxy service and load balancer may access multiple internal assets, but these assets may not be discovered by the internal scan because the multiple internal assets are "hidden" behind the third-party service. The systems and techniques described herein address such issues using multiple techniques.

First, the systems and techniques correlate internal assets found by an internal scanner with externally accessible assets found by an external scanner to create a unified picture (e.g., consolidated view) of the assets in the network. In contrast, conventional (e.g., internal only) scans may include duplicate asset records for a single asset. Each asset may have a set of attributes, such as a host name, an internet protocol (IP) address, a media access control (MAC) address, operating system (OS) family and version (e.g., Windows, Linux, or the like), hardware vendor, serial number, service tag, hosted services, banners and headers (e.g., returned by services running on open ports), and the like. The attributes of each asset are used to correlate and merge the assets determined using an internal scan and an external scan into a single asset record for each asset in a correlated asset list, thereby reducing asset duplication. The correlated asset list includes a single unified view of each asset, enabling the enterprise to quickly identify and remediate vulnerabilities associated with individual assets.

Second, the systems and techniques identify (and add to the correlated asset list) assets that may not have been identified by an asset scan. For example, some internal assets may sit behind a third party hosted proxy service, load balancer, or the like. The systems and techniques perform proxy de-obfuscation to identify assets that may not be discovered during an internal scan. The systems and techniques correlate the identified assets with assets in the correlated asset list and add the identified assets if they are not in the correlated asset list. Thus, assets that sit behind a load balancer, proxy service, or are similarly proxied through external infrastructure are identified and correlated with assets in the correlated asset list. For example, many websites and/or services are publicly inaccessible but can be reached (e.g., accessed) through load balancers, proxy services, or the like. The systems and techniques send a request to individual proxy services, inspect the internal logs of the origin host, and link the internal asset to the external proxy service, load balancer, or other third party hosted service.

Both the internal scanner and the external scanner may use more than one type of scanning techniques to create an inventory of assets included in an internal (e.g., enterprise) network. For example, an internal scanner may map an internal network space and determine internal assets by probing each host in the network to determine attributes, such as host name, running services, IP address, OS information, another type of data that can be used to identify each host, or any combination thereof. The external scanner may perform a scan based on input parameters, such as network Classless Inter-Domain Routing (CIDR) ranges and domain names. The external scan probes IP addresses and host names, based on the input parameters, using transmission control protocol (TCP) scan probes, user datagram protocol (UDP) scan probes, or the like.

After the internal scanner has determined a set of internal assets and the external scanner has determined a set of externally accessible assets, the systems and techniques automatically (without human interaction) combine the external scan data and the internal scan data to create a combined set of assets (that may be stored in a database). The automated process iteratively correlates individual assets in the set of assets with other assets in the combined set of assets to create a set of correlated assets in which there are relatively few (and preferably zero) duplicate entries. For example, the correlation algorithm may select an asset from the combined set of assets and perform a comparison of (i) the attributes of the selected asset with (ii) the attributes of other assets in the combined set of assets. In some cases, the process may create a fingerprint of the set of attributes and compare a fingerprint of attributes with a another fingerprint of another set of attributes during the comparison. If the process determines, based on the comparison, that there are at least a threshold number of common attributes (e.g., host name, IP address, MAC address, running services, OS, and other attributes), then the process may determine that the selected asset and another asset are the same asset and merge the attributes of the two assets to create a single asset in the set of correlated assets. In this way, the number of attributes that overlap between a first asset and a second asset are used to determine whether the attributes refer to the same asset, thereby reducing (and preferably eliminating) duplicate records in the correlated set of assets. For example, if there is at least (e.g., greater than or equal to) a threshold amount of overlap, then the attributes are merged to create a single entry in the correlated set of assets that is associated with the asset. If the number of attributes that overlap is less than the threshold amount, then the attributes are not merged as each of the attributes likely (with a high degree of probability) refers to a different asset.

In some cases, each of the scanners may send a request (e.g., probe) to a host, and receive a response to the request from the host. The response may include attributes associated with the host. Each scanner may create a fingerprint of the response (and/or the attributes of the host) and store the fingerprint and the attributes of the host. Each scanner may, in some cases, create a fingerprint for each open port of each host. The fingerprint may be a unique identifier to enable the fingerprint to be quickly compared to other fingerprints associated with other hosts. The fingerprint may be generated using Rabin's algorithm, a cryptographic hash function, or another type of fingerprint generator. For example, the fingerprint may be a message digest 5 (MD5), secure hash algorithm (SHA, such as SHA-0, SHA-1, SHA-2, or SHA-3), or another type of hash. By creating a fingerprint of each host's response, a scanner is able to quickly compare a first fingerprint associated with a first host with a second fingerprint associated with a second host. If the first fingerprint matches the second fingerprint, then the first host and the second host are identical and indicate a duplicate entry in a set of assets. In such cases, the scanner may merge the attributes of the first host and the second host to create a single entry associated with the host in the set of assets and thereby reduce duplicate entries in the set of assets.

In some cases, the systems and techniques may access logs that are generated and stored by each asset to obtain additional information. For example, the additional information may be used to disambiguate internal assets that are externally accessible via a proxy service, load balancer, or the like. A log is a text document that includes a record of activity associated with each asset (e.g., server) over a particular period of time. The server automatically gathers data and generates and stores a log when certain conditions are satisfied, such as when a request (e.g., a probe) is received. For example, when an asset receives a request (e.g., a hypertext transfer protocol (HTTP) request), the asset may generate a log file in a standard format, such as Common Log Format (CLF). Each log may include detailed information about the request that the asset (e.g., server) received, including, for example, an IP address of the asset, a date and time (e.g., when the request was received), a name and a location of requested data (e.g., a file), an amount of data (e.g., file size) requested, a request method (e.g., a type of request), a status of the request (e.g., whether the request was fulfilled or was not fulfilled), other request-related information, or any combination thereof. The correlation engine may inspect the logs to identify one or more particular probes (e.g., requests) that were sent by one or both of the scanners during scanning. The logs associated with external probes may be correlated back to an internal asset to determine external traffic, such as a probe, that has reached an asset in the internal network. The correlation engine may inspect the logs to disambiguate load balancer and proxy service hosted by a third party from infrastructure that the customer owns. For example, the external scanner may send a request (external probe) to a load balancer, a proxy service, or another type of service hosted by a third-party (e.g., someone external to the internal network). Later, the correlation engine examines the logs of assets in the internal network. If the correlation engine determines that a log stored in an asset was generated in response to a probe sent to a load balancer, proxy service, or another type of service, then the correlation engine is able to determine that the asset in the internal network is externally accessible and potentially vulnerable. For example, the correlation engine may determine a time when the request was sent and examine logs generated within a predetermined time period after the request was sent. If the correlation engine finds one or more logs in the predetermined time period, the correlation engine compares the request that was sent with the information in each of the one or more logs to determine whether any of the logs were generated in response to receiving the request.

After creating a correlated set of assets, the correlation engine identifies those assets that are vulnerable, such as assets on an attack perimeter of the network, such as assets that are externally accessibly. An artificial intelligence (AI) that has been trained using known vulnerabilities and known attack techniques is used to predict, for each vulnerable (e.g., externally accessible) asset, one or more vulnerabilities. The AI may predict and display the vulnerabilities and at least one solution for each vulnerability associated with each potentially vulnerable asset. For example, an asset that is "hidden" (not visible via an internal only scan) because the asset is behind a load balancer may have (i) a misconfiguration vulnerability or (ii) a software vulnerability. The misconfiguration vulnerability may include unsecure access permissions, such as an open Secure SHell (SSH) port or an open Remote Desktop Protocol (RDP) port because the organization did not realize that the asset was externally exposed. The software vulnerability may be caused by, for example, a server running an outdated, vulnerable version of web server software, such as Apache. Because the asset is externally accessible, such a vulnerability can be remotely exploited. The AI may present a solution for the misconfiguration vulnerability that includes locking down the ports, securing access to all services, and the like. The AI may present a solution to the software vulnerability that includes patching the services to a latest patch, upgrading the web server software (e.g., Apache) to a latest version, or the like. Services that are externally accessible may be given a higher patch priority because they could be exploited remotely by an attacker. The AI may rank the vulnerabilities in a particular order, with those vulnerabilities deserving the most attention listed before other vulnerabilities. For example, the AI may rank the vulnerabilities taking into (i) how well known are the vulnerabilities, (ii) vulnerabilities that, when attacked, result in significant damage, (iii) vulnerabilities that are easily addressed (e.g., by applying a patch or software upgrade), another factor, or any combination thereof.

In some cases, individual solutions suggested by the AI may include one or more selectable links that, when selected, automatically (without human interaction) cause initiation of an implementation of the solution. For example, a suggested solution may include a hyperlink titled "provide intrusion detection for port 1 on host <host identifier>". Selecting the hyperlink may cause the AI to initiate implementation of a solution by sending a message to a software application (e.g., security software, such as anti-virus software) to provide intrusion detection for port 1 of the host.

As a first example, a server includes one or more processors and one or more non-transitory computer readable media storing instructions executable by the one or more processors to perform various operations. The operations include determining a first set of assets using an internal scan engine, determining a second set of assets using an external scan engine, performing a proxy de-obfuscation process to determine a third set of assets, and combining the first set of assets, the second set of assets, and the third set of assets to create a set of combined assets. The set of combined assets includes records corresponding to a plurality of servers in an enterprise network. For example, performing the proxy de-obfuscation process may include determining that the external scan engine sent an external probe at a particular time to one of: (i) a proxy service hosted by a third party, or (ii) a load balancer hosted by a third party and based on determining that a particular asset in the enterprise network generated a log after receiving the external probe, adding the particular asset to the third set of assets. To illustrate, determining that the particular asset in the enterprise network generated the log after receiving the external probe may include: determining probe details associated with the external probe (e.g., (i) a sent timestamp indicating when the external probe was sent and (ii) request details including a type of request included in the external probe), determining log details associated with the log (e.g., the log details may include a received timestamp indicating when the particular asset received the external probe and probe details comprising a type of probe included in the external probe), and performing a comparison of the probe details with the log details. For example, the comparison may include: (i) determining that a difference between the sent timestamp and the received timestamp is less than a time difference threshold, (ii) determining that the request details match the probe details, and (iii) determining, based on the comparison, that the particular asset in the enterprise network generated the log after receiving the external probe. The type of request may, for example, be one of: a transmission control protocol (TCP) probe, a user datagram protocol (UDP) probe, or a hypertext transfer protocol secure (HTTPS) GET. The operations include performing a correlation process using the set of combined assets to create a set of correlated assets. The correlation process compares attributes of an asset with other attributes of other assets in the combined set of assets to reduce duplicate entries. The operations include determining, by an artificial intelligence algorithm, a risk of attack associated with individual assets in the set of correlated assets. The operations include determining, by the artificial intelligence, a solution to address the risk of attack for at least one correlated asset in the set of correlated assets. For example, the correlation process comparing attributes of the asset in the combined set of assets with other attributes of other assets in the combined set of assets to remove duplicate entries may include: (i) determining a first fingerprint of the attributes of the asset, (ii) determining a second fingerprint of second attributes of a second asset, and (iii) comparing the first fingerprint to the second fingerprint. The artificial intelligence (AI) algorithm be: (i) a support vector machine, (ii) an unsupervised clustering algorithm, (iii) an artificial neural network algorithm, or (iv) another type of AI algorithm. The artificial intelligence algorithm may be trained using: (i) a plurality of vulnerabilities, (ii) characteristics associated with individual vulnerabilities of the plurality of vulnerabilities, and (iii) one or more solutions to address individual vulnerabilities of the plurality of vulnerabilities.

As a second example, a server includes one or more processors and one or more non-transitory computer readable media storing instructions executable by the one or more processors to perform various operations. The operations include determining a first set of assets using an internal scan engine, determining a second set of assets using an external scan engine, performing a proxy de-obfuscation process to determine a third set of assets, and combining the first set of assets, the second set of assets, and the third set of assets to create a set of combined assets. The set of combined assets includes records corresponding to a plurality of servers in an enterprise network. The operations include performing a correlation process using the set of combined assets to create a set of correlated assets. The correlation process compares attributes of an asset in the combined set of assets with other attributes of other assets in the combined set of assets to reduce duplicate entries. The operations include determining, by an artificial intelligence (AI) algorithm, a risk of attack associated with individual assets in the set of correlated assets and determining a solution to address the risk of attack for at least one correlated asset in the set of correlated assets. The operations may include displaying, via a user interface (UI), the solution to address the risk of attack for the at least one correlated asset in the set of correlated assets and displaying, adjacent to the solution, a link to initiate implementation of the solution. The operations may include, based on determining that the link is selected, initiating implementation of the solution. For example, initiating implementation of the solution may include: downloading a software application, installing the software application, and configuring the software application to reduce the risk of attack for the at least one correlated asset. As another example, initiating implementation of the solution may include: enabling a feature of a previously installed software application to reduce the risk of attack for the at least one correlated asset. Performing the proxy de-obfuscation process may include: (1) determining that the external scan engine sent an external probe at a particular time to one of: (i) a proxy service hosted by a third party (e.g., AWS®, Crowdstrike®, or the like) or (ii) a load balancer hosted by the third party, and (2) based at least in part on determining that a particular asset in the enterprise network generated a log after receiving the external probe, adding the particular asset to the third set of assets. Determining that the particular asset in the enterprise network generated the log after receiving the external probe may include: (1) determining probe details associated with the external probe, the probe details including: (i) a sent timestamp indicating when the external probe was sent, and (ii) request details comprising a type of request included in the external probe, (2) determining log details associated with the log, the log details including: (i) a received timestamp indicating when the particular asset received the external probe, and (ii) probe details comprising a type of probe included in the external probe, (3) performing a comparison of the probe details with the log details where the comparison may include: (i) determining that a difference between the sent timestamp and the received timestamp is less than a time difference threshold, (ii) determining that the request details match the probe details, and (iii) determining, based on the comparison, that the particular asset in the enterprise network generated the log after receiving the external probe.

As a third example, one or more non-transitory computer readable media are used to store instructions executable by one or more processors to perform various operations. The operations include determining a first set of assets using an internal scan engine, determining a second set of assets using an external scan engine, performing proxy de-obfuscation process to determine a third set of assets, and combining the first set of assets, the second set of assets, and the third set of assets to create a set of combined assets. The set of combined assets includes records corresponding to a plurality of servers in an enterprise network. The operations include performing a correlation process using the set of combined assets to create a set of correlated assets. The correlation process includes comparing attributes of an asset in the combined set of assets with other attributes of other assets in the combined set of assets to reduce duplicate entries. The operations include determining, by an artificial intelligence algorithm, a risk of attack associated with individual assets in the set of correlated assets and determining a solution to address the risk of attack for at least one correlated asset in the set of correlated assets. Performing the proxy de-obfuscation process may include: (1) determining that the external scan engine sent an external probe at a particular time to one of: (i) a proxy service hosted by a third party, or (ii) a load balancer hosted by a third party, and (2) based at least in part on determining that a particular asset in the enterprise network generated a log after receiving the external probe, adding the particular asset to the third set of assets. Determining that the particular asset in the enterprise network generated the log after receiving the external probe may include: (1) determining probe details associated with the external probe including: (i) a sent timestamp indicating when the external probe was sent and (ii) request details comprising a type of request included in the external probe, (2) determining log details associated with the log including: (i) a received timestamp indicating when the particular asset received the external probe and (ii) probe details comprising a type of probe included in the external probe, (3) performing a comparison of the probe details with the log details including: (i) determining that a difference between the sent timestamp and the received timestamp is less than a time difference threshold, (ii) determining that the request details match the probe details, and (iii) determining, based on the comparison, that the particular asset in the enterprise network generated the log after receiving the external probe. The type of request may, for example, be one of: a transmission control protocol (TCP) probe, a user datagram protocol (UDP) probe, or a hypertext transfer protocol secure (HTTPS) GET. The correlation process comparing attributes of the asset in the combined set of assets with other attributes of other assets in the combined set of assets to remove duplicate entries may include: (1) determining a first fingerprint of the attributes of the asset, (2) determining a second fingerprint of second attributes of a second asset, and (3) comparing the first fingerprint to the second fingerprint. The operations may include displaying, via a user interface (UI), the solution to address the risk of attack for the at least one correlated asset in the set of correlated assets, displaying, adjacent to the solution, a link to initiate implementation of the solution, and, based on determining that the link is selected, configuring a software application to reduce the risk of attack for the at least one correlated asset.

FIG. 1 is a block diagram of a system 100 that includes a correlation engine, according to some embodiments. The system 100 may include an enterprise 102 that is connected to a representative cloud provider 104 via one or more networks 106. The enterprise 102 may include multiple hardware hosts 110, such as a server 108(1) to a server 108(M), and a server 108(M+1) to a server 108(N) (N>M>0). Each of the servers 108 may have associated attributes 112. For example, the server 108(1) may have attributes 112(1), the server 108(M) may have attributes 112 (M), the server 108(M+1) may have attributes 112(M+1), and the server 108(N) may have attributes 112(N). Each of the attributes 112 may include, for example, a host name, an internet protocol (IP) address, a media access control (MAC) address, an operating system (OS) family (e.g., Windows, Linux, or the like), OS version, hardware vendor, serial number, service tag, hosted services, banners and headers (e.g., returned by services running on open ports), another type of attribute, or any combination thereof.

The representative cloud provider 104 (e.g., Amazon® Web Services (AWS), Cloudstrike®, or the like) may host enterprise resources 114 that include computing resources used by the enterprise 102. The enterprise resources 114 may include one or more load balancers, such as a representative load balancer 116, and one or more proxy services, such as a representative proxy service 118. Both 116, 118 act as intermediaries in the communication between clients and servers. In some cases, 116, 118 may be implemented as software applications that are hosted by the cloud provider 104. The load balancer 116 distributes incoming client requests among the servers 108, and returns a response from the server that processed the request to the appropriate client. The load balancer 116 is typically used when a volume of requests is too much for a single server to handle efficiently. Typically, the servers behind the load balancer 116 host the same content, and the job of the load balancer 116 is to distribute the workload in a way that makes the best use of each server's capacity, prevents overload of any server, and results in a fast response to the client request. The proxy service 118 accepts a request from a client, forwards it to one of the servers 108 that can fulfill the request, and returns the server's response to the client. The proxy service 118 (also referred to as a reverse proxy) may be used with a single server. For example, an address associated with the proxy service 118 may be advertised to access a website. The proxy service 118 may be located at an edge of the site's network to accept requests from web browsers and mobile apps for the content hosted at the website. The advantage of the proxy service 118 is that the backend servers (e.g., one or more of the servers 108) are not visible outside the enterprise 102. Because clients see a single address associated with the proxy service 118, the enterprise 102 can adjust the number of servers 108 (e.g., scaling the number of servers 108 based on demand) without changing the address.

The enterprise 102 may use an internal scan engine 130 to create a set of internal assets 138. For example, the internal scan engine 132 may perform an internal scan by sending an internal probe 134 to individual servers of the hosts 110, receive data 136 (in response to the internal probe 134), and use the data 136 to create the set of internal assets 138. The enterprise 102 may periodically schedule the internal scan engine 132 to perform a scan to update the set of internal assets 138. The data 136 may include the attributes 112 associated with one of the servers 108 that received the internal probe 134 and sent the data 136 in response. A disadvantage of using the internal scan engine 132 to determine the set of internal assets 138 is that a portion of the servers 108 located behind a third-party party hosted service, such as the load balancer 116 or the proxy service 118, may not be included in the set of internal assets 138. For example, in FIG. 1, the internal assets 138 may include server 108(1) to 108(M) but exclude server 108(M+1) to server 108(N) because server 108(M+1) to server 108(N) are located behind a third-party party hosted service, such as the load balancer 116 or proxy service 118. In some cases, the internal scan engine 132 may create a fingerprint 160 based on the attributes 112, the data 136, or both and store the fingerprint 160 and the attributes in the set of internal assets 138. Thus, the fingerprint 160(1) is determined based on the attributes 112(1), the fingerprint 160(M) is determined based on the attributes 112(M), the fingerprint 160(M+1) is determined based on the attributes 112(M+1), and the fingerprint 160(N) is determined based on the attributes 112(N). The internal scan engine 132 may, in some cases, create a fingerprint 160 for each open port of individual ones of the servers 108. The fingerprint 160 may be a unique identifier to enable a fingerprint 160 (e.g., 160(N)) to be quickly compared to other fingerprints (e.g., 160(1) to 160(N−1)). The fingerprint 160 may be generated using Rabin's algorithm, a cryptographic hash function, or another type of fingerprint generator. For example, the fingerprint 160 may be a message digest 5 (MD5), secure hash algorithm (SHA, such as SHA-0, SHA-1, SHA-2, or SHA-3), or another type of hash. By creating a fingerprint 160 based on the data 136, the attributes 112, or both, the internal scan engine 132 is able to quickly compare a first fingerprint 160 associated with a first asset with a second fingerprint 160 associated with a second asset. If the first fingerprint matches the second fingerprint, then the first asset and the second asset are identical and indicate a duplicate entry in a set of internal assets 138. In such cases, the internal scan engine 132 may merge the entries of the first asset and the second asset to create a single entry associated with the asset in the set of internal assets 138 to reduce duplicate entries.

To identify externally visible assets that may not be identified by the internal scan engine 132, the enterprise 102 may deploy an external scan engine 120 to create a set of externally accessible assets 126. The external scan engine 120 may perform a scan based on input parameters 127 provided by the enterprise 102. The input parameters may include, for example, network Classless Inter-Domain Routing (CIDR) ranges, domain names, or other types of addresses. The external scan engine 120 may send an external probe 122 to individual hosts identified by the input parameters 127. For example, the external scan engine 120 may send an external probe 122 to individual internet protocol (IP) addresses and individual host names, based on the parameters 127. The external probe 122 may be a transmission control protocol (TCP) probe, a user datagram protocol (UDP) probe, a Hypertext Transfer Protocol Secure (HTTPS) request, or the like. The external scan engine 120 may receive a response 124 to sending the external probe 122. The response 124 may include host data 125 associated with the host that sent the response 124. The external scan engine 120 may create the set of externally accessible assets 126 based on the host data 125 included in the response 124. The response 124 may include one or more of a response to (i) an HTTPS GET request, (ii) SYN scan results for common TCP services (resulting from a TCP probe), (iii) an SSL Certificate (e.g., X.509 certificate metadata observed when communicating with HTTPS endpoints), (iv) UDP scan results for common UDP services, (v) another type of result to a request, or any combination thereof. The external scan engine 120 may identify the externally accessible assets 126 that may include at least one host not included in the set of internal assets 138.

In some cases, the external scan engine 120 may provide a filter 128 to filter the externally accessible assets 126 to create filtered external assets 130. The filter 128 may be specified by the enterprise 102 and may include, for example, (1) a filter type, (2) a search operator, and (3) a filter value. The filter type may specify whether to filter on (i) a domain name (e.g., www.rapid7.com), (ii) a host IP range (e.g., 192.168.1.0-192.169.1.255), (iii) a scan date (e.g., 'within the last 30 days'), or any combination thereof. The search operator may be used to match assets to a provided. For example, the search operators (shown in all capital letters for ease of understanding) may include (i) CONTAINS (e.g., filters based on a partial match), (ii) IS (e.g., filters based on an exact match), (iii) WITHIN THE LAST (e.g., filters based on a time frame), or any combination thereof. The external scan engine 120 may, in some cases, create a fingerprint 160 for each server 108, each open port of individual servers 108, or both. By creating a fingerprint 160 based on the response 124, the attributes 112, or both, the external scan engine 120 is able to quickly compare a first fingerprint 160 associated with a first asset with a second fingerprint 160 associated with a second asset in the filtered external assets 130. If the first fingerprint matches the second fingerprint, then the first asset and the second asset are identical and indicate a duplicate entry in the filtered external assets 130. In such cases, the external scan engine 120 may merge the entries of the first asset and the second asset to create a single entry associated with the asset in the filtered external assets 130 to reduce duplicate entries.

The enterprise 102 may use a correlation module 140 to correlate the internal assets 138 and the filtered external assets 130, identify (e.g., disambiguate) one or more of the hosts 110 that are hidden behind a third-party hosted service (e.g., the load balancer 116, the proxy service 118, or another similar service), identify potentially vulnerable assets (e.g., assets located on an attack perimeter), determine (using AI) risks associated with each potentially vulnerable asset, and suggest (using AI) solutions to address the vulnerabilities. The correlation module 140 in the internal scan engine 132 may execute on one of the servers 108 in the enterprise 102.

The correlation module 140 may create a combined set of assets 144 that includes the internal assets 138 and the filtered external assets 130. A proxy de-obfuscation module 142 may be used to identify one or more of the hosts 110 that are hidden behind a third-party hosted service (e.g., the load balancer 116, the proxy service 118, or another similar service). Hidden means that the assets are, in many cases, not identified by the internal scan engine 132 during an internal scan. For example, the proxy de-obfuscation module 142 may identify the servers 108(M+1) to 108(N) as being located behind services (e.g., the load balancer 116, the proxy service 118) hosted by a third-party (e.g., the cloud provider 104) and add the servers 108(M+1) to 108(N) to the combined assets 143. For example, the de-obfuscation module 142 may use the logs 158 to disambiguate the servers 108(M+1) to 108(N) that are externally accessible via the load balancer 116 and the proxy service 118. Each of the servers 108 automatically generate and store a log when certain conditions are satisfied, such as when a request (the external probe 122) is received. For example, in response to receiving the external probe 122 (e.g., TCP probe, UDP probe, HTTPS GET, or the like), individual ones of the servers 108 may generate a log (e.g., in a format, such as Common Log Format (CLF)) and store the log in the logs 158. The log may include detailed information about the request (external probe 122) that the server 108 received, including, for example, an IP address of the server 108, a date and time (e.g., when the probe 122 was received), a name and a location of requested data (e.g., a file), an amount of data (e.g., file size) requested, a request method (e.g., a type of request), a status of the request (e.g., whether the request was fulfilled or was not fulfilled), other request-related information, or any combination thereof. The proxy de-obfuscation module 142 may inspect the logs 158 to identify particular external probes 122 that were sent by the external scan engine 120. Particular logs in the logs 158 may be identified as being generated in response to the external scan engine 120 sending the external probe 122 and correlated back to one or more of the servers 108. For example, the external scan engine 120 may send the external probe 122 to the load balancer 116 or to the proxy service 118. However, one or more of the logs 158(M+1) to logs (N) may include a log generated in response to the external probe 122. In this way, the proxy de-obfuscation module 142 may correlate the log generated in response to the external probe 122 and determine that one or more of the servers 108(M+1) to 108(N) are externally accessible via the load balancer 116 and the proxy service 118. Thus, the external scan engine 120 sends the external probe 122 to the load balancer 116 or the proxy service 118 and the proxy de-obfuscation module 142 examines the logs 158 of the server 108 in the internal network of the enterprise 102. If the proxy de-obfuscation module 142 determines that a log stored in one of the servers 108 was generated in response to the external probe 122 that was sent to the load balancer 116 or the proxy service 118, then the proxy de-obfuscation module 142 is able to determine that the server 108 that generated the log is externally accessible and creates a potential vulnerability. For example, the proxy de-obfuscation module 142 may determine a time when the external probe 122 was sent and examine the logs 158 generated within a predetermined time period after the external probe 122 was sent. If the proxy de-obfuscation module 142 finds one or more logs 158 in the predetermined time period, then the proxy de-obfuscation module 142 determines whether one of the logs 158 was generated by the server 108 in response to receiving the external probe 122 through the load balancer 116 or proxy service 118. In this way, the proxy de-obfuscation module 142 may add to the set of combined assets 143 one or more of the servers 108 that are accessible through the load balancer 116 or the proxy service 118.

The correlation module 140 may correlate the combined assets 143 to create the correlated assets 144. For example, the correlation module 140 may select an asset (e.g., one of the servers 108) from the filtered external assets 130 and perform a comparison of the attributes of the selected asset with individual attributes of other assets (e.g., others of the servers 108). If the comparison indicates that at least a threshold number of attributes are common, then the correlation module 140 may determine that the two assets being compared referred to the same asset and merge the attributes to create a single entry in the set of correlated assets 144, thereby reducing duplicate entries. In some cases, the correlation module 140 or the scan engines 120, 132 may determine the fingerprint 160 (e.g., based on (i) the attributes 112, (ii) the data 136 or the response 124, or (iii) both). In such cases, the comparison may include comparing the fingerprint 160 of the selected asset with a fingerprint 160 of other assets in the correlated assets 144. If the comparison is a match (e.g., indicating at least a predetermined number of attributes overlap), then the fingerprints 160 both refer to the same asset and the records are merged to create a single record for the asset in the correlated assets 144. In this way, duplicate entries are removed to create the set of correlated assets 144.

After the correlation module 140 has created the correlated assets 144, and artificial intelligence (AI) module 146 may be used to perform a risk assessment 148 associated with individual assets in the correlated assets 144 that have potential vulnerabilities. For example, the servers 108(1) to 108(M) may not be externally accessible and so the AI 146 may indicate that the potential vulnerability is zero or low (e.g., less than a predetermined threshold). If the servers 108(M+1) to 108(N) are externally accessible (e.g., through a third party hosted service, such as the load balancer 116 or the proxy service 118), then the AI 146 may provide a vulnerability score to each of the servers 108(M+1) to 108(N) greater than or equal to the predetermined threshold to indicate that the vulnerability is sufficiently significant. For the portion of the assets in the correlated assets 144 for which the AI 146 has determined a vulnerability score greater than or equal to the predetermined threshold, the AI 146 may provide one or more suggestions 150 to address the potential vulnerabilities. For example, the vulnerability score (included or displayed in the risks 154) may be between zero and one thousand, with zero indicating no vulnerability no vulnerability and one thousand indicating a highest vulnerability based on the probability of an attacker exploiting the vulnerability. In some cases, if the risk assessment 148 is low (e.g., less than the predetermined threshold), then the AI 146 may not provide any suggestions. For example, the AI 146 may create a list of assets 152(1) to 152(P) that have one or more potential vulnerabilities and identify, for each of the assets 152, one or more risks 154. The AI 146 may suggest one or more solutions 156 for each of the risks 154. In some cases, each of the solutions 156 may have a corresponding link 158 that, when selected, causes the associated solution 156 to be viewed or initiated. For example, a system administrator may select one of the links 158 to view a page on a website (e.g., of a security provider, such as Rapid7®) providing additional information on the associated solution 156. As another example, a system administrator may select one of the links 158 to initiate implementation of the associated solution. To illustrate, selection of one of the links 158 may cause a particular software solution to be downloaded and installed, cause a feature of previously installed software to be enabled, or the like. In some cases, the AI 146 may automatically (without human interaction) initiate implementation of solutions to address vulnerabilities having a score greater than a vulnerability threshold. For example, if the vulnerability score is between 1-1000, the AI 146 may automatically implement solutions for vulnerabilities greater than a vulnerability threshold of 900 (or another threshold). In this way, the AI 146 may automatically initiate addressing vulnerabilities of assets having a large amount of risk (a high vulnerability score) to proactively protect the assets from a potential attack. For example, if the use of a particular attack is rapidly increasing, then the AI 146 may automatically initiate implementing a solution (e.g., installing a software application, enabling a particular feature of a software application, or the like) to prevent the particular attack. The AI 146 may be periodically (at a predetermined time interval, such as every Y months, Y>0) re-trained with training data that includes newly discovered vulnerabilities and corresponding solutions to the newly discovered vulnerabilities. The AI 146 may be a support vector machine, an unsupervised clustering algorithm, an artificial neural network algorithm, or another type of artificial intelligence.

Thus, an enterprise may have multiple assets (e.g., servers), some of which are hidden behind third-party hosted service, such as a load balancer or a proxy service, and therefore not accounted for when an internal scan is performed. The enterprise may use an external scan to identify externally accessible assets and use a correlation module to correlate (1) the externally accessible assets with (2) internal assets identified using an internal scan to create correlated assets. Artificial intelligence may be used to predict a vulnerability of attack for individual assets of the correlated assets. The artificial intelligence may provide suggested solutions to address the vulnerability. In some cases, the solutions may include a link that, when selected, initiates implementation of the suggested solution, such as by installing a software application, enabling a feature of a software application, or the like. In this way, assets that are externally accessible but unidentified using an internal scan are identified using an external scan, potential vulnerabilities associated with each asset are identified, and solutions to at least some of the potential vulnerabilities are provided. In some cases, the artificial intelligence may determine a numerical risk assessment associated with each of the potential vulnerabilities, with a zero-risk assessment indicating a low risk and 1000 risk assessment indicating a high risk. The correlation module may rank the assets based on the risk assessment in descending order, with higher risk assets listed before lower risk assets to enable the highest risk vulnerabilities to be addressed as quickly as possible.

Figure 2:
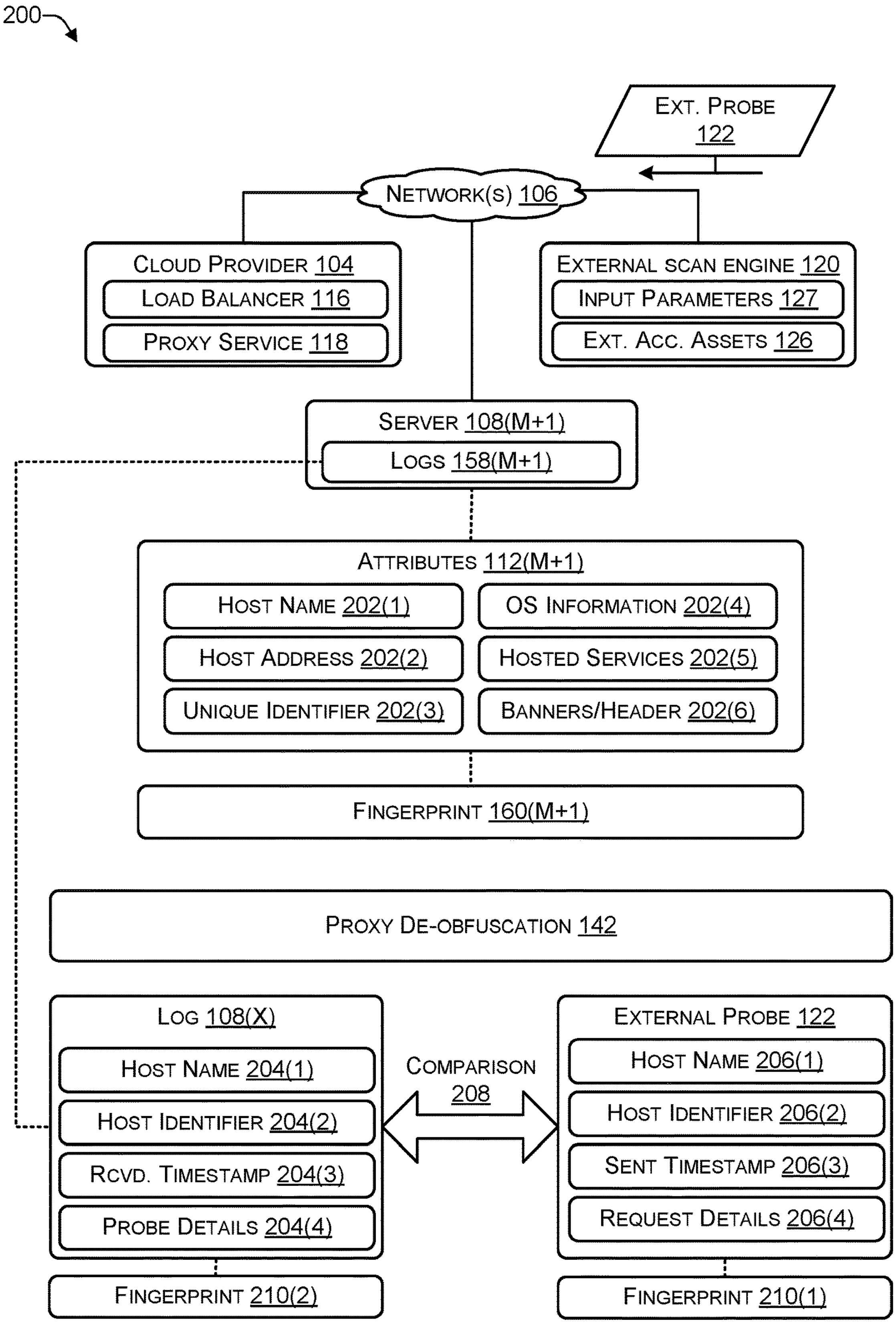
FIG. 2 is a block diagram of a system that includes a proxy de-obfuscation module, according to some embodiments.

FIG. 2 is a block diagram of a system 200 that includes a proxy de-obfuscation module, according to some embodiments. In the system 200, the external scan engine 120 may send an external probe, such as the representative external probe 122, to addresses provided in the input parameters 127. For example, when the input parameters 127 include the load balancer 116, the proxy service 118, or both, the external probe 122 may be sent, from the load balancer 116 or the proxy service 118, to one or more of the servers in the enterprise, such as the representative server 108(M+1).

The server 108(M+1) may have associated attributes 112(M+1) that include, for example, a hostname 202(1), at least one host address 202(2) (e.g., IP address, MAC address, or both), a unique identifier 202(3) (e.g., serial number, service tag, or another unique identifier), operating system (OS) information 202(4) (e.g., OS provider, OS version, OS updates installed, and the like), hosted services 202(5) (e.g., services hosted by the server 108(M)), banners/headers 202(6) (e.g., returned by services running on open ports). Of course, the attributes shown are purely for illustration purposes and may include additional attributes besides those illustrated in FIG. 2.

The server 108(M), in response to receiving the external probe 122, generates a log, such as the representative log 108(X), and stores the log 108(X) in the logs 158(M+1). The log 108(X) may include various types of information associated with the server 108(M+1) and the external probe 122 including, for example, a host name 204(1) (of the server 108(M+1)), a host identifier 204(2) (e.g., an IP address, a MAC address, a serial number, a service tag, or another identifier associated with the server 108(M+1)), a received timestamp 204(3) (indicating a date and time when the external probe 122 was received), and probe details 204(4) (e.g., a type of request associated with the external probe 122, such as a TCP probe, UDP probe, HTTPS GET, or the like, how much data was requested, whether the request was successfully processed, and the like). Of course, each log may include additional information besides 204(1), 204(2), 204(3), 204(4) that are shown in FIG. 2.

The external probe 122 may include, for example, a hostname 206(1), a host identifier 206(2), or both that identify an intended recipient of the external probe 122. The external probe 122 may include a set timestamp 206(3) (indicating a date and time when the external scan engine 120 sent the external probe 122) and request details 206(4) (e.g., a type of request associated with the external probe 122, such as a TCP probe, a UDP probe, an HTTPS GET, or the like, the data being requested, and other request-related information). Of course, the external probe 122 may include additional information in addition to 206(1), 206(2), 206(3), 206(4) shown in FIG. 2.

The proxy de-obfuscation module 142 performs a comparison 208 of at least a portion of the individual logs 158(M+1), such as the representative log 108(X), with the external probe 122 to determine whether the server 108(M+1) is externally accessible. For example, the comparison 208 may include (i) comparing the host name 204(1) with the host name 206(1), (ii) comparing the host identifier 204(2) with the host identifier 206(2), (iii) comparing the received timestamp 204(3) with the sent timestamp 206(3), (iv) comparing the request details 204(4) with the request details 206(4), or any combination thereof. For example, the proxy de-obfuscation module 142 may identify a portion of the logs 158(M+1) that were generated within a predetermined period of time (e.g., Y seconds, indicating a maximum latency in the network 106) after the sent timestamp 206(3) to reduce a number of the logs 158(M) that are compared to the external probe 122 in the comparison 208.

In some cases, the proxy de-obfuscation module 142 may extract a portion of the contents of the external probe 122 to create a fingerprint 210 (e.g., a hash or digest, such as MD5) and extract a portion of the contents of the log 108(X) to create a fingerprint 210(2). In such cases, the comparison 208 may include comparing the fingerprint 210(1) with the fingerprint 210(2) to determine whether the log 108(X) was created by the server 108(M+1) in response to receiving the external probe 122.

Thus, the proxy de-obfuscation module 142 performs the comparison 208 to determine if the log 158(X) was generated by the server 108 in response to receiving the external probe 122. If the comparison 208 indicates that the log 158(X) was generated by the server 108 in response to receiving the external probe 122, then the server 108(M+1) is externally accessible because the external probe 122, that was sent to an external address (e.g., the load balancer 116 or the proxy service 118) ended up being sent to one of the servers 108(M+1) in the internal network of the enterprise 102 of FIG. 1. In this way, the proxy de-obfuscation module 142 is able to determine which of the internal assets are externally accessible and potentially vulnerable to attack by a malicious actor.

In the flow diagrams of FIGS. 3, 4, 5, 6, and 7, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the processes 300, 400, 500, 600, and 700 are described with reference to FIGS. 1 and 2 as described above, although other models, frameworks, systems and environments may be used to implement these processes.

Figure 3:
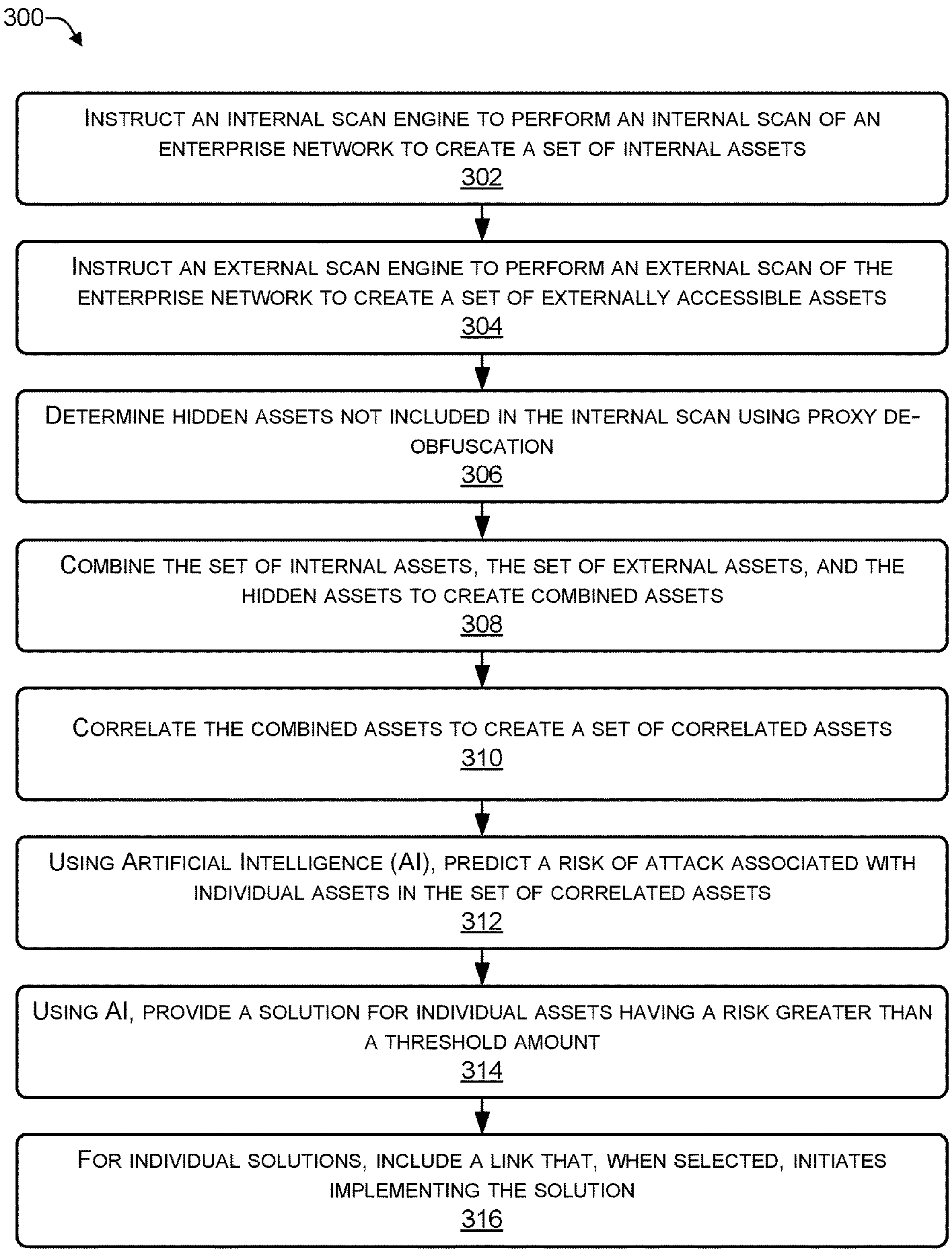
FIG. 3 is a flowchart of a process that includes correlating externally accessible assets with internal assets, according to some embodiments.

FIG. 3 is a flowchart of a process 300 that includes correlating externally accessible assets with internal assets, according to some embodiments. The process 300 may be performed by the correlation module 140 of FIG. 1.

At 302, the process may instruct an internal scanner to perform an internal scan of an enterprise network to create a set of internal assets. For example, in FIG. 1, the correlation module 140 may instruct the internal scan engine 132 to create the set of internal assets 138.

At 304, the process may instruct an external scanner to perform an external scan of the enterprise network to create a set of externally accessible assets. For example, in FIG. 1, the correlation module 140 may instruct the external scan engine 120 to create the set of filtered external assets 130.

At 306, the process may determine hidden assets not included in the internal scan using proxy de-obfuscation. For example, in FIG. 2, the proxy de-obfuscation module 142 may identify one or more of the hosts 110 that are hidden behind a third-party hosted service (e.g., the load balancer 116, the proxy service 118, or another similar service). For example, the proxy de-obfuscation module 142 may identify the servers 108(M+1) to 108(N) as being located behind services (e.g., the load balancer 116, the proxy service 118) hosted by a third-party (e.g., the cloud provider 104). For example, the de-obfuscation module 142 may use the logs 158 to disambiguate the servers 108(M+1) to 108(N) that are externally accessible via the load balancer 116 and the proxy service 118. Each of the servers 108 automatically generate and store a log when certain conditions are satisfied, such as when a request (the external probe 122) is received. In response to receiving the external probe 122, the server 108 may generate and store a log in the logs 158. The log may include detailed information about the request that the server 108 received, including, for example, an IP address of the server 108, a date and time (e.g., when the probe 122 was received), a name and a location of requested data (e.g., a file), an amount of data (e.g., file size) requested, a request method (e.g., a type of request), a status of the request (e.g., whether the request was fulfilled or was not fulfilled), other request-related information, or any combination thereof. The proxy de-obfuscation module 142 may inspect the logs 158 to identify particular logs in the logs 158 as being generated in response to receiving the external probe 122 and correlated back to one of the servers 108. For example, the external scan engine 120 may send the external probe 122 to the load balancer 116 or to the proxy service 118. The logs 158(M+1) to logs (N) may include a log generated in response to the external probe 122. In this way, the proxy de-obfuscation module 142 may identify the log generated in response to the external probe 122 and determine that one or more of the servers 108(M+1) to 108(N) are externally accessible (via the load balancer 116 or the proxy service 118).

At 308, the process may combine the set of internal set assets, the set of external assets, and the hidden assets to create combined assets. For example, in FIG. 1, the externally accessible assets 126 (or the filtered external assets 130) may be combined with the internal assets 138 and with hidden assets identified by the proxy de-obfuscation module 142 to create the combined assets 143.

At 310, the process may correlate the combined assets to create a set of correlated assets. For example, in FIG. 1, the correlation module 140 or the scan engines 120, 132 may determine the fingerprint 160 (e.g., based on (i) the attributes 112, (ii) the data 136 or the response 124, or (iii) both). In such cases, the correlation module 140 may compare the fingerprint 160 of a selected asset with a fingerprint 160 of the other assets in the correlated assets 144. If the comparison is a match (e.g., indicating at least a predetermined number of attributes overlap), then the fingerprints 160 both refer to the same asset and the records are merged to create a single record for the asset in the correlated assets 144. In this way, duplicate entries are removed from the combined assets 143 to create the set of correlated assets 144.

At 312, the process may use AI to predict a risk of attack associated with individual assets in the set of correlated assets. At 314, the process may use AI to provide a solution for individual assets having a risk greater than a threshold amount. At 316, the process may include a link with an individual solution that, when selected, initiates implementing the solution. For example, in FIG. 1, the artificial intelligence (AI) module 146 may perform a risk assessment 148 associated with individual assets in the correlated assets 144 that have potential vulnerabilities. For example, if the servers 108(M+1) to 108(N) are externally accessible (e.g., through a third party hosted service, such as the load balancer 116 or the proxy service 118), then the AI 146 may provide a vulnerability score for each of the servers 108(M+1) to 108(N) between 0 and 1,000, with zero indicating no vulnerability no vulnerability and one thousand indicating a highest vulnerability based on the probability of an attacker exploiting the vulnerability. For the portion of the assets having a vulnerability score greater than or equal to a predetermined threshold, the AI 146 may provide one or more suggestions 150 (e.g., solutions 156) to address the potential vulnerabilities. The AI 146 may provide one or more solutions 156 for each of the risks 154. In some cases, each of the solutions 156 may have a corresponding link 158 that, when selected, causes the associated solution 156 to be viewed or initiated.

Thus, a correlation module may instruct in internal scan engine to perform an internal scan to determine internal assets and instruct in external scan engine to perform an external scan to determine externally accessible assets. The correlation module may use a proxy de-obfuscation module to identify internal assets not identified by the internal scan that are externally accessible via a third-party hosted service, such as a load balancer or proxy service. In this way, assets in an internal network that are externally accessible and vulnerable to attack can be identified and the vulnerabilities addressed.

FIG. 4 is a flowchart of a process 400 that includes creating a set of internal assets, according to some embodiments. The process 400 may be performed by the internal scan engine 132 of FIG. 1.

At 402, the process (the internal scan engine 132) may send multiple data requests to multiple hardware hosts in an enterprise network. At 404, the process may receive data associated with an individual hardware hosts of the multiple hardware hosts in response to an individual data request of the multiple data requests. At 406, the process may create a set of internal assets that includes hardware hosts in the network based at least in part on the data. For example, in FIG. 1, the internal scan engine 132 may send the internal probe 134 to individual hosts of the hosts 110, receive the data 136 in response to sending the internal probe 134, and create the set of internal assets 138 based on the data 136.

At 408, the process may perform a comparison of attributes of a particular hardware host with other attributes of other hardware hosts in the host data. Based on the comparison, the process may merge attributes of the particular hardware host with another hardware host if there are greater than a threshold number of attributes that overlap (e.g., to reduce duplication) in the set of internal assets. For example, in FIG. 1, the internal scan engine 132 may compare the attributes 112 of a first asset with the attributes of a second asset in the internal assets 138. If the internal scan engine 132 determines that greater than a threshold number of attributes overlap, e.g., are common to both assets, then the internal scan engine may merge the attributes of the two assets to create a single entry in the internal assets 138 to reduce duplicate entries. In some cases, the comparison of attributes may be performed by creating a fingerprint of the attributes of each host. For example, the internal scan engine 132 may perform a comparison of a first fingerprint associated with the first asset with a second fingerprint associated with the second asset to determine whether the attributes reference the same asset.

At 412, the process may maintain the set of internal assets based on sending additional data requests at a later date. For example, the internal scan engine 132 may, at a later date, send the internal probes 134 to the hosts 110, receive the data 136, and update the internal assets 138 based on the data 136.

Thus, an internal scan engine may perform an internal scan of assets in an enterprise network to create a set of internal assets. The internal scan engine may compare attributes of individual assets with other assets in the set of internal assets to reduce duplicate entries in the set of internal assets.

FIG. 5 is a flowchart of a process 500 that includes creating a set of externally accessible assets, according to some embodiments. The process 500 may be performed by the external scan engine 120 of FIG. 1.

At 502, the process (the external scan engine 120) may receive input parameters (e.g., network classless inter-domain routing (CIDR) ranges, domain names, or the like) associated with an enterprise network. At 504, the process may perform actions based on the input parameters to determine host addresses of multiple hardware hosts in the enterprise network. The actions may include performing a forward domain name service (FDNS), a reverse domain name service (RDNS), an HTTP GET, or another action to obtain host addresses associated with the input parameters. For example, in FIG. 1, the external scan engine 120 may determine host addresses of the hosts 110 based at least in part on the input parameters 127 by using an action such as FDNS, RDNS, HTTP GET, another action, or any combination thereof.

At 506, the process may send multiple probes (e.g., TCP scan, UDP scan, or the like) to the multiple hardware host, where individual probes of the multiple probes are sent to individual hardware hosts of the multiple hardware hosts. At 508, the process may receive host data from the individual hardware hosts (e.g., in response to sending the individual probes). At 510, the process may create a set of externally accessible assets that include hardware hosts in the network based at least in part on the host data. For example, in FIG. 1, the external scan engine 120 may send the external probe 122 to individual host addresses. In response to sending the external probe 122, the external scan engine 120 may receive the response 124 from one of the hosts 110. Based on the host data included in the response 124, the external scan engine 120 may create the set of externally accessible assets 126. The response 124 may include one or more of a response to (i) an HTTPS GET request, (ii) SYN scan results for common TCP services (resulting from a TCP probe), (iii) an SSL Certificate (e.g., X.509 certificate metadata observed when communicating with HTTPS endpoints), (iv) UDP scan results for common UDP services, (v) another type of result to a request, or any combination thereof.

At 512, the process may perform a comparison of attributes of a particular hardware host with other attributes of other hardware hosts in the set of externally accessible assets. At 514, the process may, based on the comparison, merge attributes of the particular hardware host with another hardware host if there is greater than a threshold number of attributes that overlap (e.g., to reduce duplication) in the set of externally accessible assets. For example, in FIG. 1, the external scan engine 120 may compare the attributes 112 of a first asset with the attributes of a second asset in the externally accessible assets 126. If the external scan engine 120 determines that greater than a threshold number of attributes overlap, e.g., are common to both assets, then the external scan engine 120 may merge the attributes of the two assets to create a single entry in the externally accessible assets 126 to remove duplicate entries. In some cases, the comparison of attributes may be performed by creating a fingerprint of the attributes of each host. For example, the external scan engine 120 may perform a comparison of a first fingerprint associated with the first asset with a second fingerprint associated with the second asset to determine whether the attributes reference the same asset.

At 516, the process may maintain the set of externally visible asset based on sending additional probes at a later date. For example, the external scan engine 120 may send the external probe 122 at a later date (e.g., after Y months, Y>0) and update the externally accessible assets 126 based on the response 124 to the external probe 122.

Thus, an external scan engine may use input parameters provided by an enterprise to determine host addresses and send a probe to individual host addresses. The host associated with the host address may send a response to receiving the probe. The response may include host data associated with the host. The external scan engine may use the host data to create a set of externally accessible assets. Some of the assets in the set of externally accessible assets may not be included in the set of internal assets identified by an internal scan engine, particularly if the assets are located behind a third-party hosted service, such as a load balancer or a proxy service.

Figure 6:
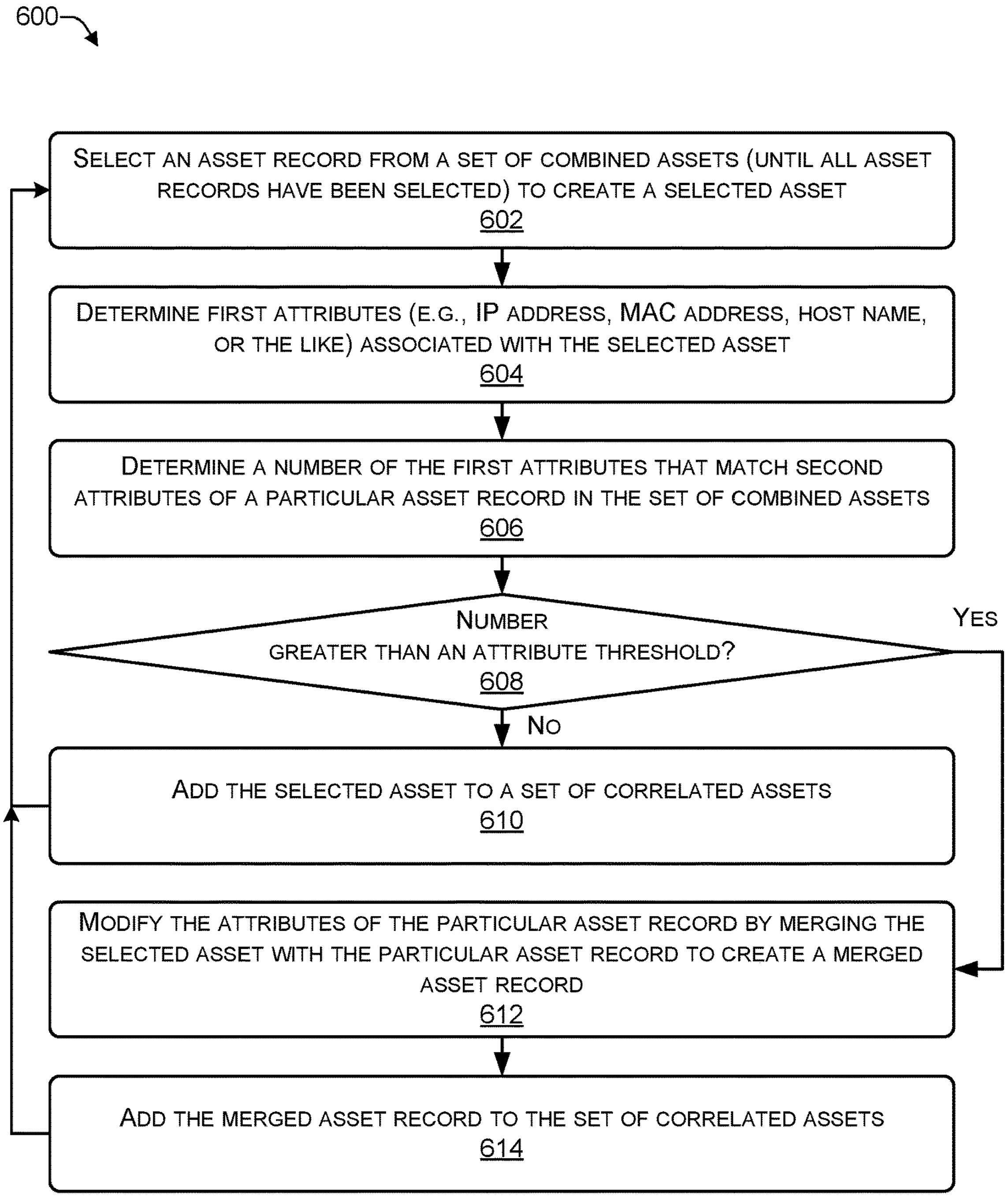
FIG. 6 is a flowchart of a process that includes comparing a selected asset to individual assets in a set of assets, according to some embodiments.

FIG. 6 is a flowchart of a process 600 that includes comparing a selected asset record to individual assets in a set of combined assets, according to some embodiments. The process 600 may be performed by the correlation module 140 of FIG. 1. For example, the correlation module 140 may use the process 602 to correlate the combined assets 143 to create the correlated assets 144.

At 602, the process may select an asset record from a set of combined assets (until all assets have been selected) to create a selected asset. At 604, the process may determine first attributes associated with the selected asset. At 606, the process may determine a number of the first attributes that match second attributes of a particular asset in a set of combined assets. For example, in FIG. 1, the correlation module 140 may select an asset from the set of combined assets 143 and perform a comparison of the attributes 112 of the selected asset with attributes of assets in the set of combined assets 143. The correlation module 140 may determine, based on the comparison, a number of attributes that match.

At 608, the process may make a determination whether the number of the first attributes that match the second attributes is greater than an attribute threshold. If the process determines, at 608, that "no" the number is not greater than (e.g., is less than or equal to) the attribute threshold, then the selected asset is added to a set of correlated assets and the process proceeds back to 602 to select another asset record (until all asset records in the set of combined assets have been selected). The process ends when all asset records in the set of combined assets have been selected. If the process determines, at 608, that "yes" the number is greater than the attribute threshold, then the process may proceed to 612, where the attributes of the particular asset are modified based on the selected attributes of the selected asset by merging the particular asset record with the selected asset in the set of correlated assets to create a merged asset record. At 614, the process adds the merged asset record to the set of correlated assets. For example, in FIG. 1, if the correlation module 140 determines that the number of attributes of the selected asset that match the attributes of a particular asset in the set of combined assets 143 is less than or equal to an attribute threshold, then the selected asset does not have a duplicate entry in the set of combined assets 143, and is added to the correlated assets 144. If the correlation module 140 determines that the number of attributes of the selected asset that match the attributes of a particular asset in the set of combined assets 143 is greater than the attribute threshold, then the attributes also likely refer to the same asset (indicating a duplicate entry), in which case the correlation module 140 merges the attributes of the selected asset with the particular asset to create a merged asset record and adds the merged asset record to the set of correlated assets 144. The process proceeds back to 602 to select another asset record (until all asset records in the set of combined assets have been selected). The process ends when all asset records in the set of combined assets have been selected.

Thus, a correlation module may compare each asset record a set of combined assets to create a correlated set of assets. For example, the attributes of a selected asset record from the set of external assets may be compared with the attributes of other asset records in the combined set of assets. In some cases, the comparison may be performed by comparing of fingerprint of the attributes of the selected asset with a fingerprint of the attributes of another asset. In this way, duplicate entries are reduced (or eliminated) in the correlated set of assets.

Figure 7:
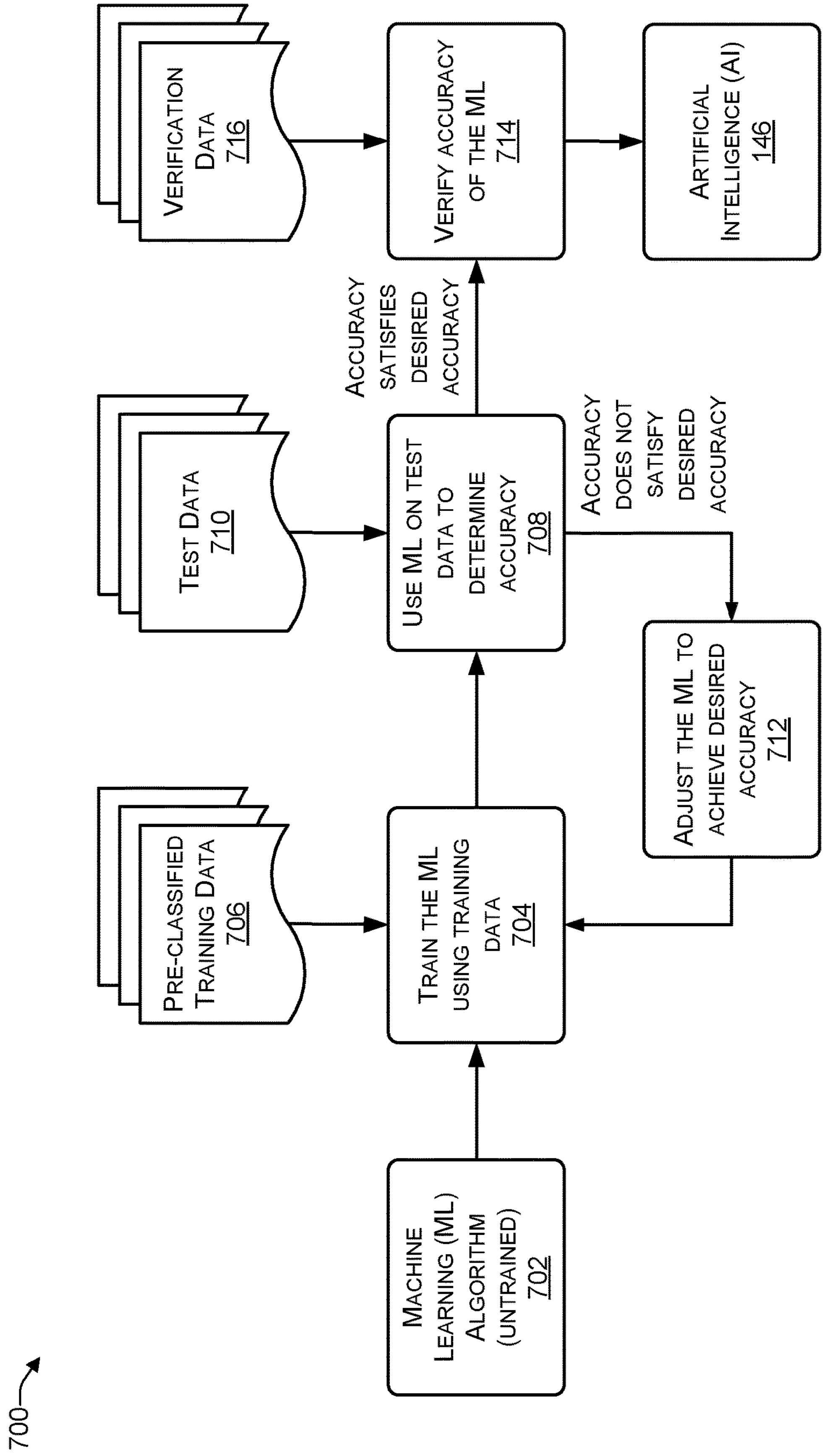
FIG. 7 is a flowchart of a process that includes training a machine learning algorithm to create an artificial intelligence (AI), according to some embodiments.

FIG. 7 is a flowchart of a process 700 that includes training a machine learning algorithm to create an artificial intelligence (AI), according to some embodiments. For example, the process 700 may be performed by one of the hosts 110 of FIG. 1 to create the AI 146.

At 702, a machine learning algorithm (e.g., software code that has not yet been trained) may be created by one or more software designers. At 704, the machine learning algorithm may be trained using pre-classified training data 706 (e.g., vulnerabilities, characteristics of the vulnerabilities, solutions, and the like). For example, the training data 706 may have been pre-classified by humans, by machine learning, or a combination of both. After the machine learning has been trained using the pre-classified training data 706, the machine learning may be tested, at 708, using test data 710 to determine an accuracy of the machine learning. For example, in the case of a classifier, the accuracy of the classification may be determined using the test data 710.

If an accuracy of the machine learning does not satisfy a desired accuracy (e.g., 95%, 98%, 99% accurate), at 708, then the machine learning code may be modified (e.g., adjusted), at 712, to achieve the desired accuracy. For example, at 712, the software designers may modify the machine learning software code to improve the accuracy of the machine learning algorithm. After the machine learning has been tuned, at 712, the machine learning may be retrained, at 704, using the pre-classified training data 706. In this way, 704, 708, 712 may be repeated until the machine learning is able to classify the test data 710 with the desired accuracy.

After determining, at 708, that an accuracy of the machine learning satisfies the desired accuracy, the process may proceed to 714, where verification data 716 may be used to verify an accuracy of the machine learning. After the accuracy of the machine learning is verified, at 714, the artificial intelligence 119, which has been trained to provide a particular level of accuracy may be used. For example, the AI 146 may be trained to detect vulnerabilities in external exposed assets, determine (based on the vulnerabilities) a risk score for each externally exposed asset, provide one or suggestions on addressing the vulnerabilities and reducing the risk, or any combination thereof. The AI 146 may be a support vector machine, an unsupervised clustering algorithm, an artificial neural network algorithm, or another type of artificial intelligence.

Figure 8:
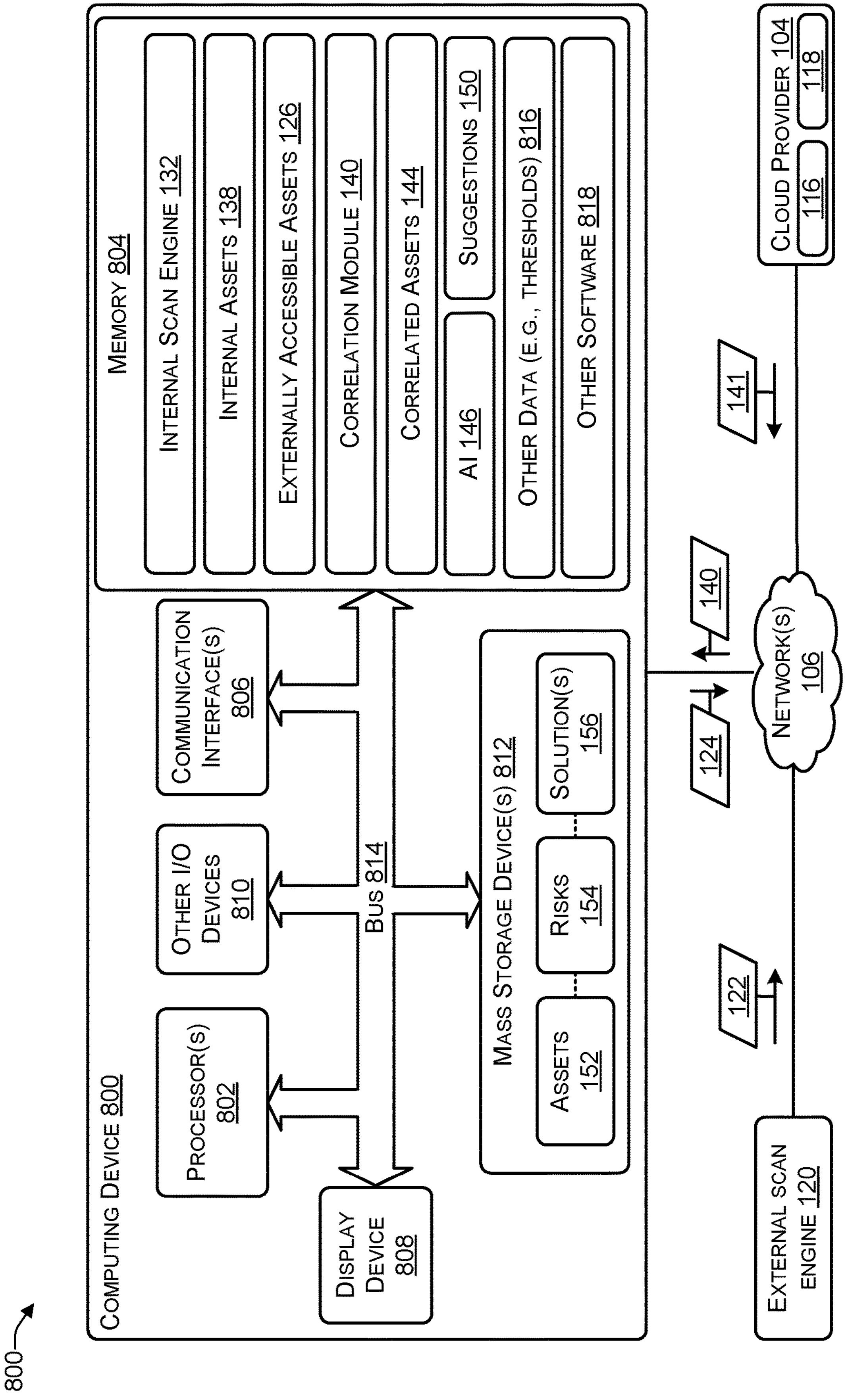
FIG. 8 illustrates an example configuration of a computing device that can be used to implement the systems and techniques described herein.

FIG. 8 illustrates an example configuration of a computing device 800 that can be used to implement the systems and techniques described herein, such as each of the servers 100 of FIG. 1.

The computing device 800 may include one or more processors 802 (e.g., central processing unit (CPU), graphics processing unit (GPU), or the like), a memory 804, communication interfaces 806, a display device 808, other input/output (I/O) devices 810 (e.g., keyboard, trackball, and the like), and one or more mass storage devices 812 (e.g., disk drive, solid state disk drive, or the like), configured to communicate with each other, such as via one or more system buses 814 or other suitable connections. While a single system bus 814 is illustrated for ease of understanding, it should be understood that the system buses 814 may include multiple buses, such as a memory device bus, a storage device bus (e.g., serial ATA (SATA) and the like), data buses (e.g., universal serial bus (USB) and the like), video signal buses (e.g., ThunderBolt®, digital video interface (DVI), High-Definition Multimedia Interface (HDMI), and the like), power buses, etc.

The processors 802 are one or more hardware devices that may include a single processing unit or multiple processing units, all of which may include single or multiple computing units or multiple cores. The processors 802 may include a GPU that is integrated into the CPU or the GPU may be a separate processor device from the CPU. The processors 802 may be implemented as one or more microprocessors, microcomputers, microcontrollers, digital signal processors, central processing units, graphics processing units, state machines, logic circuitries, and/or any devices that manipulate signals based on operational instructions. Among other capabilities, the processors 802 are configured to fetch and execute computer-readable instructions stored in the memory 804, mass storage devices 812, and other types of non-transitory computer-readable media.

Memory 804 and mass storage devices 812 are examples of non-transitory computer storage media (e.g., memory storage devices) for storing instructions that can be executed by the processors 802 to perform the various functions described herein. For example, memory 804 may include both volatile memory and non-volatile memory (e.g., RAM, ROM, or the like) devices. Further, mass storage devices 812 may include hard disk drives, solid-state drives, removable media, including external and removable drives, memory cards, flash memory, floppy disks, optical disks (e.g., compact disc (CD), digital versatile disc (DVD)), a storage array, a network attached storage, a storage area network, or the like. Both memory 804 and mass storage devices 812 may be collectively referred to as memory or computer storage media herein and include any type of non-transitory media capable of storing computer-readable, processor-executable program instructions as computer program code that can be executed by the processors 802 as a particular machine configured for carrying out the operations and functions described in the implementations herein.

The computing device 800 may include one or more communication interfaces 806 for exchanging data via the network(s) 106. The communication interfaces 806 can facilitate communications within a wide variety of networks and protocol types, including wired networks (e.g., Ethernet, DOCSIS, DSL, Fiber, USB etc.) and wireless networks (e.g., WLAN, GSM, CDMA, 802.11, Bluetooth, Wireless USB, ZigBee, cellular, satellite, etc.), the Internet and the like. Communication interfaces 806 can also provide communication with external storage, such as a storage array, network attached storage, storage area network, cloud storage, or the like.

The display device 808 may be used for displaying content (e.g., information and images) to users. Other I/O devices 810 may be devices that receive various inputs from a user and provide various outputs to the user, and may include a keyboard, a touchpad, a mouse, a printer, audio input/output devices, and so forth.

The computer storage media, such as memory 804 and mass storage devices 812, may be used to store software and data. For example, the computer storage media may be used to store the internal scan engine 132, the internal assets 138, the externally accessible assets 126, the correlation module 140, the correlated assets 144, the AI 146, the suggestions 150, other data (e.g., thresholds) 816, and other software.

The systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:

determining, by one or more processors, a first set of assets using an internal scan engine;

determining, by the one or more processors, a second set of assets using an external scan engine;

performing, by the one or more processors, a proxy de-obfuscation process to determine a third set of assets, wherein performing the proxy de-obfuscation process comprises:

determining that the external scan engine sent an external probe at a particular time to one of a proxy service hosted by a third party or a load balancer hosted by a third party, determining that a particular asset in the enterprise network generated a log after receiving the external probe, comprising:

determining probe details associated with the external probe, the probe details comprising:

a sent timestamp indicating when the external probe was sent, and request details comprising a type of request included in the external probe, determining log details associated with the log, the log details comprising:

a received timestamp indicating when the particular asset received the external probe, and probe details comprising a type of probe included in the external probe, performing a comparison of the probe details with the log details, the comparison comprising:

determining that a difference between the sent timestamp and the received timestamp is less than a time difference threshold, and determining that the request details match the probe details, and determining, based on the comparison, that the particular asset in the enterprise network generated the log after receiving the external probe, and adding the particular asset to the third set of assets;

combining, by the one or more processors, the first set of assets, the second set of assets, and the third set of assets to create a set of combined assets, the set of combined assets comprising records corresponding to a plurality of servers in an enterprise network;

performing, by the one or more processors, a correlation process using the set of combined assets to create a set of correlated assets, the correlation process comparing attributes of an asset in the combined set of assets with other attributes of other assets in the combined set of assets to reduce duplicate entries;

determining, by an artificial intelligence executed by the one or more processors, a risk of attack associated with individual assets in the set of correlated assets; and determining, by the artificial intelligence, a solution to address the risk of attack for at least one correlated asset in the set of correlated assets.

2. The method of claim 1 wherein the type of request comprises one of:

a transmission control protocol (TCP) probe;

a user datagram protocol (UDP) probe; or a hypertext transfer protocol secure (HTTPS) GET.

3. The method of claim 1, wherein the correlation process comparing attributes of the asset in the combined set of assets with other attributes of other assets in the combined set of assets to remove duplicate entries comprises:

determining a first fingerprint of the attributes of the asset;

determining a second fingerprint of second attributes of a second asset; and comparing the first fingerprint to the second fingerprint.

4. The method of claim 1, wherein the artificial intelligence comprises one of:

a support vector machine;

an unsupervised clustering algorithm; or an artificial neural network algorithm.

5. The method of claim 1, wherein the artificial intelligence is trained using:

a plurality of vulnerabilities;

one or more characteristics of individual vulnerabilities of the plurality of vulnerabilities, and one or more solutions to address individual vulnerabilities of the plurality of vulnerabilities.

6. A server comprising:

one or more processors; and one or more non-transitory computer readable media storing instructions executable by the one or more processors to perform operations comprising:

determining a first set of assets using an internal scan engine;

determining a second set of assets using an external scan engine;

performing a proxy de-obfuscation process to determine a third set of assets, wherein performing the proxy de-obfuscation process comprises:

determining that the external scan engine sent an external probe at a particular time to one of a proxy service hosted by a third party or a load balancer hosted by a third party, determining that a particular asset in the enterprise network generated a log after receiving the external probe, comprising:

determining probe details associated with the external probe, the probe details comprising:

a sent timestamp indicating when the external probe was sent, and request details comprising a type of request included in the external probe, determining log details associated with the log, the log details comprising:

a received timestamp indicating when the particular asset received the external probe, and probe details comprising a type of probe included in the external probe, performing a comparison of the probe details with the log details, the comparison comprising:

determining that a difference between the sent timestamp and the received timestamp is less than a time difference threshold, and determining that the request details match the probe details, and determining, based on the comparison, that the particular asset in the enterprise network generated the log after receiving the external probe, and adding the particular asset to the third set of assets;

combining the first set of assets, the second set of assets, and the third set of assets to create a set of combined assets, the set of combined assets comprising records corresponding to a plurality of servers in an enterprise network;

performing a correlation process using the set of combined assets to create a set of correlated assets, the correlation process comparing attributes of an asset in the combined set of assets with other attributes of other assets in the combined set of assets to reduce duplicate entries;

determining, by an artificial intelligence, a risk of attack associated with individual assets in the set of correlated assets; and determining a solution to address the risk of attack for at least one correlated asset in the set of correlated assets.

7. The server of claim 6, the operations further comprising:

displaying, via a user interface, the solution to address the risk of attack for the at least one correlated asset in the set of correlated assets; and displaying, adjacent to the solution, a link to initiate implementation of the solution.

8. The server of claim 7, the operations further comprising:

based on determining that the link is selected, initiating implementation of the solution.

9. The server of claim 8, wherein initiating implementation of the solution comprises:

downloading a software application;

installing the software application; and configuring the software application to reduce the risk of attack for the at least one correlated asset.

10. The server of claim 8, wherein initiating implementation of the solution comprises:

enabling a feature of a previously installed software application to reduce the risk of attack for the at least one correlated asset.

11. One or more non-transitory computer readable media storing instructions executable by one or more processors to perform operations comprising:

determining a first set of assets using an internal scan engine;

determining a second set of assets using an external scan engine;

performing proxy de-obfuscation process to determine a third set of assets, wherein performing the proxy de-obfuscation process comprises:

determining that the external scan engine sent an external probe at a particular time to one of a proxy service hosted by a third party or a load balancer hosted by a third party, determining that a particular asset in the enterprise network generated a log after receiving the external probe, comprising:

determining probe details associated with the external probe, the probe details comprising:

a sent timestamp indicating when the external probe was sent, and request details comprising a type of request included in the external probe, determining log details associated with the log, the log details comprising:

a received timestamp indicating when the particular asset received the external probe, and probe details comprising a type of probe included in the external probe, performing a comparison of the probe details with the log details, the comparison comprising:

determining that a difference between the sent timestamp and the received timestamp is less than a time difference threshold, and determining that the request details match the probe details, and determining, based on the comparison, that the particular asset in the enterprise network generated the log after receiving the external probe, and adding the particular asset to the third set of assets;

combining the first set of assets, the second set of assets, and the third set of assets to create a set of combined assets, the set of combined assets comprising records corresponding to a plurality of servers in an enterprise network;

performing a correlation process using the set of combined assets to create a set of correlated assets, the correlation process comparing attributes of an asset in the combined set of assets with other attributes of other assets in the combined set of assets to reduce duplicate entries;

determining, by an artificial intelligence, a risk of attack associated with individual assets in the set of correlated assets; and determining a solution to address the risk of attack for at least one correlated asset in the set of correlated assets.

12. The one or more non-transitory computer readable media of claim 11, wherein the type of request comprises one of:

a transmission control protocol (TCP) probe;

a user datagram protocol (UDP) probe; or a hypertext transfer protocol secure (HTTPS) GET.

13. The one or more non-transitory computer readable media of claim 11, wherein the correlation process comparing attributes of the asset in the combined set of assets with other attributes of other assets in the combined set of assets to remove duplicate entries comprises:

determining a first fingerprint of the attributes of the asset;

determining a second fingerprint of second attributes of a second asset; and comparing the first fingerprint to the second fingerprint.

14. The one or more non-transitory computer readable media of claim 11, the operations further comprising:

displaying, via a user interface, the solution to address the risk of attack for the at least one correlated asset in the set of correlated assets;

displaying, adjacent to the solution, a link to initiate implementation of the solution; and based on determining that the link is selected, configuring a software application to reduce the risk of attack for the at least one correlated asset.

* * * * *